United States Patent
Kim et al.

(10) Patent No.: US 10,444,736 B2
(45) Date of Patent: Oct. 15, 2019

(54) COMMUNICATION SYSTEM AND OPERATING METHOD THEREOF

(71) Applicant: LSIS CO., LTD., Anyang-si, Gyeonggi-do (KR)

(72) Inventors: Young In Kim, Seongnam-si (KR); Ae Kyoung Bae, Anyang-si (KR); Hong Joo Kim, Seoul (KR); Yoon Sung Cho, Gyeongsan-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 490 days.

(21) Appl. No.: 14/970,371

(22) Filed: Dec. 15, 2015

(65) Prior Publication Data

US 2016/0306342 A1  Oct. 20, 2016

(51) Int. Cl.
*G05B 19/414* (2006.01)
*H02J 13/00* (2006.01)
*G08C 17/02* (2006.01)
*H02J 3/00* (2006.01)

(52) U.S. Cl.
CPC .......... *G05B 19/414* (2013.01); *G08C 17/02* (2013.01); *H02J 13/0027* (2013.01); *G05B 2219/32404* (2013.01); *G08C 2201/51* (2013.01); *H02J 3/00* (2013.01); *Y02E 60/7884* (2013.01); *Y04S 40/143* (2013.01)

(58) Field of Classification Search
CPC ........ G05B 19/414; G05B 2219/32404; G08C 17/02; G08C 2201/51; H02J 13/0027; H02J 3/00; Y02E 60/7884; Y04S 40/143
USPC ........................................................... 700/9
See application file for complete search history.

(56) References Cited

U.S. PATENT DOCUMENTS

| | | | | |
|---|---|---|---|---|
| 5,742,795 A | * | 4/1998 | Kussel | G06F 17/509 |
| | | | | 703/2 |
| 6,441,586 B1 | * | 8/2002 | Tate, Jr. | G01R 31/3648 |
| | | | | 320/132 |
| 8,634,965 B1 | * | 1/2014 | Gou | H02J 13/0006 |
| | | | | 700/286 |
| 9,287,713 B2 | * | 3/2016 | Sharon | G06F 17/509 |
| 2009/0149972 A1 | | 6/2009 | Nasle | |

(Continued)

FOREIGN PATENT DOCUMENTS

| | | |
|---|---|---|
| CN | 101938372 A | 1/2011 |
| CN | 103296750 A | 9/2013 |

(Continued)

OTHER PUBLICATIONS

Korean Intellectual Property Office Application Serial No. 10-2015-0054783, Office Action dated Mar. 2, 2016, 4 pages.

(Continued)

*Primary Examiner* — Chun Cao
(74) *Attorney, Agent, or Firm* — K&L Gates LLP (57) ABSTRACT

A communication system is provided. The communication system includes a communication device receiving a state signal from at least one remote terminal unit (RTU), generating signal quality data for the state signal, and transmitting, to a control device, the generated signal quality data and the received state signal. The control device generates state estimation data for each of the at least one RTU on a basis of the state signal received from the communication device, corrects the signal quality data transmitted from the communication device according to at least one preset condition, and changes the generated state estimation data on a basis of the corrected signal quality data and the received state signal.

14 Claims, 7 Drawing Sheets

(56) References Cited

U.S. PATENT DOCUMENTS

| | | |
|---|---|---|
| 2009/0254655 A1 | 10/2009 | Kidwell et al. |
| 2010/0315942 A1 | 12/2010 | Jackson et al. |
| 2011/0153108 A1 | 6/2011 | Yoon et al. |
| 2012/0046889 A1* | 2/2012 | Sun .......................... H02J 3/00 702/61 |
| 2012/0179301 A1* | 7/2012 | Aivaliotis ................. H02J 3/00 700/286 |
| 2013/0214927 A1* | 8/2013 | Kim ..................... G08B 21/185 340/638 |
| 2013/0311800 A1 | 11/2013 | Matsui |
| 2015/0025700 A1 | 1/2015 | Choi et al. |

FOREIGN PATENT DOCUMENTS

| | | |
|---|---|---|
| EP | 2632007 | 8/2013 |
| JP | 09-289083 | 11/1997 |
| JP | 2007-189840 | 7/2007 |
| JP | 2013-046210 | 3/2013 |
| KR | 10-1095976 | 12/2011 |
| KR | 10-2013-0096472 | 8/2013 |
| WO | 2006/098105 | 9/2006 |
| WO | 2009-237936 | 10/2009 |

OTHER PUBLICATIONS

Yun, et al., "Data Modeling for Developing the Baseline Network Analysis Software of Korean EMS System," Oct. 2009, pp. 1842-1848.
European Patent Office Application Serial No. 16151538.2, Search Report dated Sep. 6, 2016, 7 pages.

* cited by examiner

COMMUNICATION SYSTEM AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2015-0054783, filed on Apr. 17, 2015, the contents of which are hereby incorporated by reference herein in its entirety.

BACKGROUND

The present disclosure relates to a communication system and an operating method thereof, and particularly, to a communication system and an operating method thereof, which generate system analysis information on a remote terminal unit (RTU) of a supervisory control and data acquisition (SCADA) system to control each RTU.

A SCADA system is defined as a communication system for collecting, receiving, recording, and displaying, at a remote control center (RCC), state signal data (or points) of a plurality of RTUs using an analog or digital signal on a communication path, and allowing the RCC to supervise and control each of the RTUs.

The SCADA system is typically a system for supervising and controlling, in a centralized manner, many kinds of remote facilities such as power generation, transmission, and distribution facilities, a petrochemical plant, an iron and steel making facility, and a factory automation facility, etc.

The SCADA system performs functions of a supervising system that performs a pre-determined operation according to a state of an RTU. For example, the SCADA system performs an alarm function, a supervising and controlling function for selectively operating the RTU manually or automatically, and an instructing function or a displaying function of a supervising system that receives, displays, or records a state signal of the RTU.

The RCC of the SCADA system periodically obtains a state signal (or state value) at determined times, generates system analysis information (or unique algorithm) used for controlling the plurality of RTUs on the basis of the obtained state signals, and controls each of the RTUs on the basis of the generated system analysis information.

Furthermore, the RCC may receive the state signal (or value) (e.g. "open" or "close") from each RTU and at the same time, receive signal quality information (e.g. "good" or "suspect") including whether each state signal is normal or erroneous, generate RTU analysis information, which is analysis information on each RTU, in response to the received signal quality information, and may collect the RTU analysis information on each RTU to generate system analysis information that is analysis information on the plurality of RTUs.

For example, when receiving, from an RTU, an "open" state signal together with normal signal information (e.g. "good") including information that the corresponding "open" state signal is normal, a control device 100 generates RTU analysis information that the "RTU" is "open" on the basis of the corresponding "open" state signal, and generates system analysis information for analyzing the plurality of RTUs including "open RTUs" by reflecting the RTU analysis information that "RTU is opened".

On the other hand, for example, when receiving, from an RTU, a "close" (i.e. connected) state signal together with erroneous signal information (e.g. "suspect") including information that the corresponding "close" states signal is an erroneous signal, the control device 100 generates RTU analysis information that "the RTU" is "open" on the basis of the "open" state signal received therewith at the time of receiving "good" signal quality data, which is last received before receiving signal quality data of "suspect" instead of the corresponding "close" state signal in response to the erroneous signal information ("e.g. suspect"), and reflects the RTU analysis information to generate the system analysis information for analyzing the plurality of RTUs including "opened RTUs".

Figure 1:
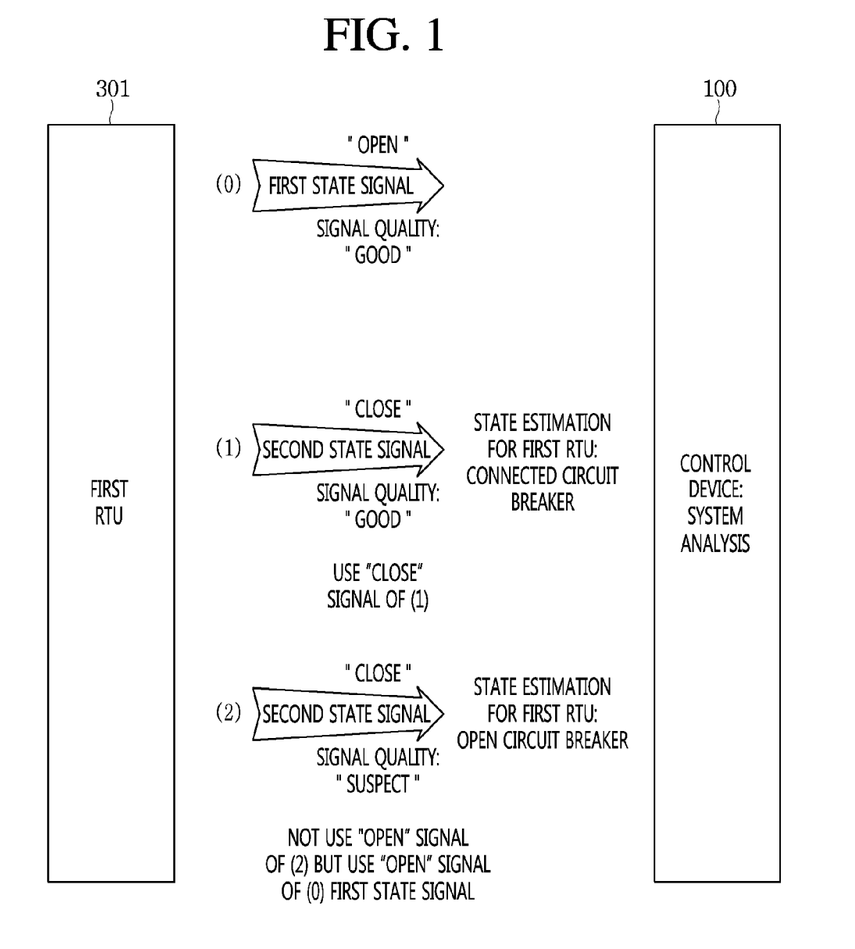
FIG. 1 is a block diagram illustrating a method for generating system analysis information according to a related art.

Referring to FIG. 1, the control device 100 may obtain signal quality data of "GOOD" together with an "OPEN" state signal (or "a first state signal") (0) obtained from a first RTU 301, and may execute system analysis according to the obtained state signal and signal quality data.

An example of the RTU may include a circuit breaker.

After receiving the first state signal (0), when obtaining a "CLOSE" state signal (or a second state signal) (1) and signal quality data of "GOOD" from the first RTU, the control device 100 may trust the "CLOSE" state signal (1) and generate state estimation data (e.g. "connected circuit breaker") for the first RTU 301 in response to the "CLOSE" state signal (1).

However, unlike this, after receiving the first state signal, when obtaining "CLOSE" state signal (the second state signal) (2) and signal quality data of "SUSPECT" from the first RTU, the control device 100 may not trust the "CLOSE" state signal (2) and may generate state estimation data ("opened circuit breaker") for the first RTU 301 in response not to the "CLOSE" state signal (2), but to the "OPEN" state signal (the first state signal) (0) received together with the last "GOOD" signal quality data.

Accordingly, as described above, in analyzing the system analysis information, matching between the signal quality data and each state signal obtained from each RTU is significant.

However, for the signal quality data, a "good" signal may be changed to a "suspect" signal and the "suspect" signal may be analyzed as the "good signal", due to a physical limitation in communication through which each signal quality data is received or an error occurring in each RTU itself regardless of the quality of an actual state signal.

Accordingly, operations are necessary to determine whether the signal quality data from each RTU is erroneous.

SUMMARY

Embodiments provide a communication system and operation method thereof capable of reducing occurrence of errors and improving matching at the time of generating system analysis information on each RTU.

In one embodiment, a communication system includes: a communication device receiving a state signal from at least one remote terminal unit (RTU), generating signal quality data for the state signal, and transmitting, to a control device, the generated signal quality data and the received state signal; and the control device generating state estimation data for each of the at least one RTU on the basis of the state signal received from the communication device, correcting the signal quality data transmitted from the communication device according to at least one preset condition, and changing the generated state estimation data on the basis of the corrected signal quality data and the received state signal.

In another embodiment, an operating method of a communication system includes: receiving a state signal from at least one RTU; generating signal quality data for the state signal; generating state estimation data for each of the at least one RTU on the basis of the state signal; correcting the signal quality data according to at least one preset condition; and changing the generated state estimation data on the basis of the corrected signal quality data and the received state signal.

The details of one or more embodiments are set forth in the accompanying drawings and the description below. Other features will be apparent from the description and drawings, and from the claims.

DETAILED DESCRIPTION OF THE EMBODIMENTS

Hereinafter, the embodiments will now be described in detail with reference to the accompanying drawings. However, the disclosure cannot be limited to the embodiment in which the idea of the disclosure is presented, and another embodiment included within range of idea of another backward disclosure or the present disclosure may be easily proposed by addition, change, deletion and the like of another element.

In the following description, detailed descriptions of well-known functions or constructions will be omitted since they would obscure the invention in unnecessary detail. Moreover, numerals (e.g., first, second, etc.) in the description are used only to distinguish one element from another.

The terms used in this specification were selected to include current, widely-used general terms. In certain cases, a term may be one that was arbitrarily established by the applicant. In such cases, the meaning of the term will be defined in the relevant portion of the detailed description. As such, the terms used in the specification are not to be defined simply by the name of the terms but are to be defined based on the meanings of the terms as well as the overall description of the present disclosure.

It will be understood that when an element is referred to as being "connected" or "coupled" to another element, it may be directly connected or coupled to the other element or intervening elements may be present in between unless otherwise specified.

Throughout this specification, when an element is referred to as "including" a component, it does not preclude another component but may further include the other component unless the context clearly indicates otherwise.

Hereinafter, embodiments of the present invention will be described in detail with reference to the accompanying drawings. It should be noted that the same reference numerals are used to designate the same or similar elements throughout the drawings.

Figure 2:
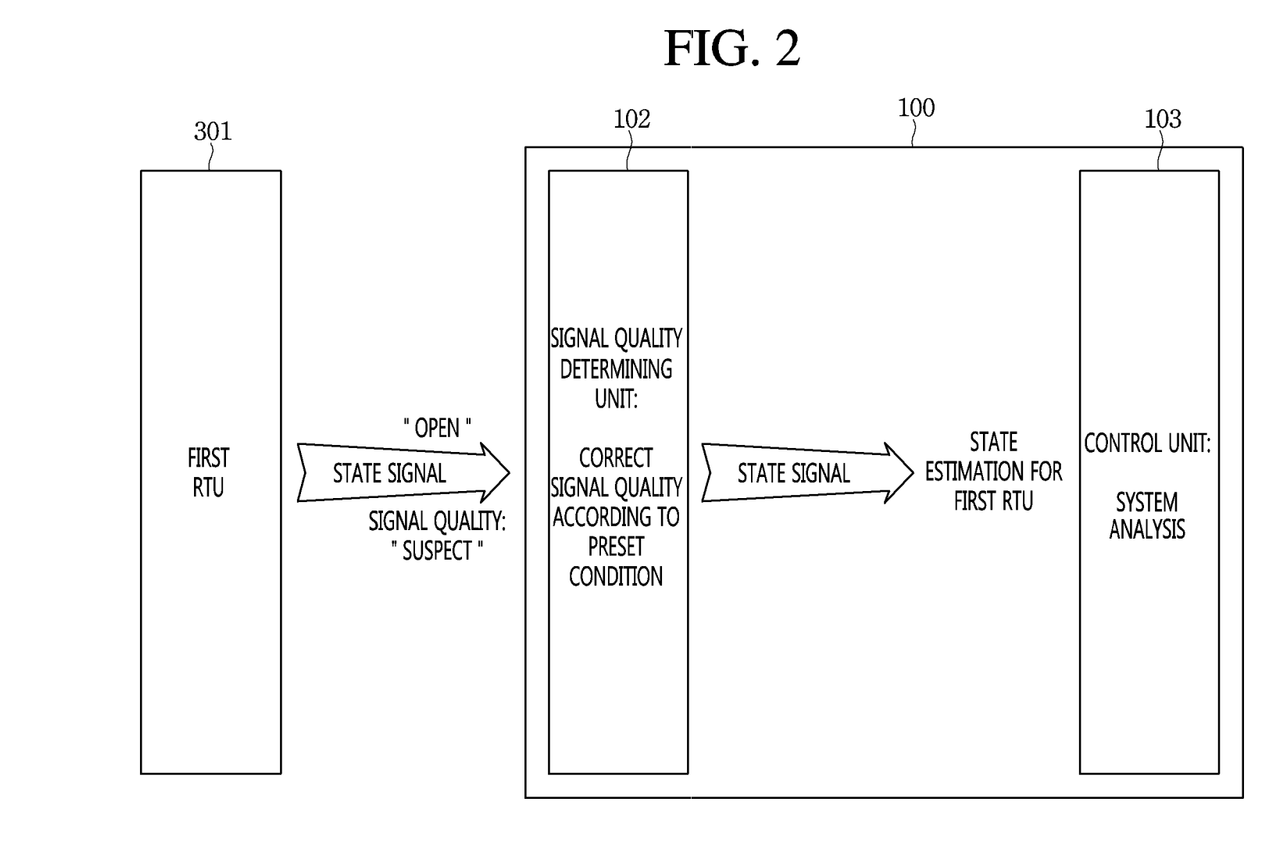
FIG. 2 is a block diagram illustrating a method for generating system analysis information according to an embodiment.

FIG. 2 is a block configuration illustrating a method for generating system analysis information according to an embodiment.

As illustrated in FIG. 2, a communication system may include a first remote terminal unit (RTU) 301 and a control device 100. The control device 100 may include a signal quality determining unit 102 and a control unit 103.

Referring to FIG. 2, the signal quality determining unit 102 may obtain an "OPEN" state signal and signal quality data including quality information of "SUSPECT", which are output from the RTU 301.

When the signal quality data of "SUSPECT" is obtained, the signal quality determining unit 102 may correct the signal quality data according to a preset condition.

An example of the present condition may include whether a circuit breaker (not illustrated) in the first RTU 301 is opened and a description thereabout will be provided with reference to FIGS. 3 to 7.

A description is provided with reference to FIG. 2 again.

The signal quality determining unit 102 may transmit the corrected signal quality data and the "OPEN" state signal to the control unit 103.

When the corrected signal quality data and the state signal are received, the control unit 103 may perform state estimation on the first RTU 301 on the basis of the corrected signal quality data and the state signal.

In more detail, the control unit 103 may generate state estimation data for the first RTU 301 in response to the corrected signal quality data and the state signal.

When the state estimation data for the first RTU 301 is generated, the control unit 103 may perform system analysis on the basis of the state estimation data for each RTU.

In more detail, the control unit 103 may generate the system analysis information on the basis of the "OPEN" state signal output from the first RTU 301 and the corrected signal quality data output from the signal quality determining unit 102.

Figure 3:
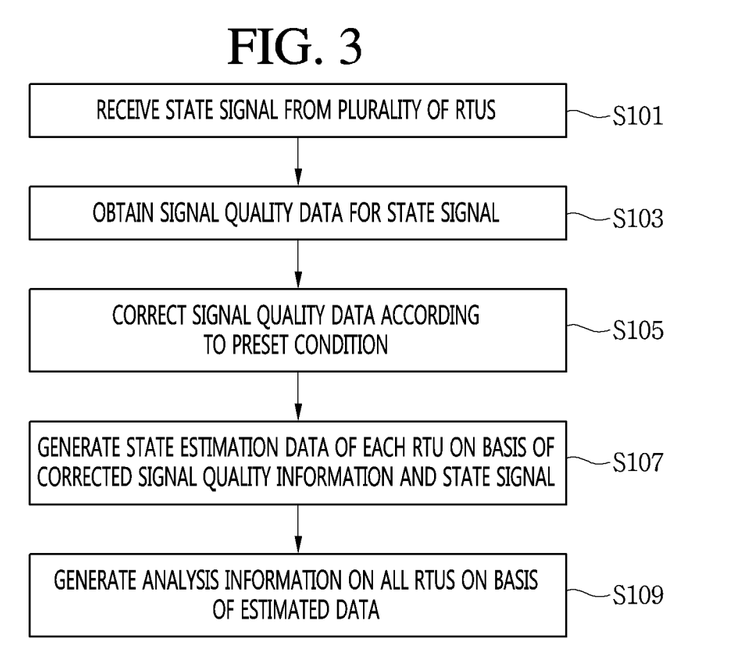
FIG. 3 is a flowchart illustrating a method for generating system analysis information according to an embodiment.

FIG. 3 is a flowchart illustrating a method for generating system analysis information according to an embodiment.

Referring to FIG. 3, the control device 100 (of FIG. 1) (or the control device 100 of FIG. 2) receives a state signal including state information on each RTU from a plurality of RTUs (operation S101).

In more detail, the signal quality determining unit 102 (of FIG. 2) in the control device 100 may receive the state signal of each RTU from the plurality of RTUs.

When receiving the state signal from each RTU, the signal quality determining unit 102 obtains the signal quality data for each received state signal (operation S103).

As an example of obtaining the signal quality data, the signal quality determining unit 102 may obtain the signal quality data through a communication device 200 (of FIG. 4) to be described later in the communication system. However, the example of obtaining the signal quality data is not limited thereto.

Once obtaining the signal quality data, the signal quality determining unit 102 corrects the signal quality data according to a preset condition to generate the corrected signal quality data (operation S105).

In detail, the signal quality determining unit 102 may further determine whether the signal quality data is "Good" or "suspect" according to the preset condition, and generate the corrected signal quality data on the basis thereof.

The preset condition may be diversely modified according to embodiments.

According to an embodiment, the signal quality data may be corrected by distinguishing a system-separated facility from a system. For example, when all circuit breakers in the system are closed, presence of the facility separated from the system may be determined to be faulty.

According to an embodiment, the signal quality data may be corrected by distinguishing a voltage-applied facility from open facilities. For example, when there is a facility in which a circuit breaker that connects a generator to a load is in an open state, but the generator or the load is in a voltage-applied (i.e. driven) state, the facility may be determined to be faulty.

According to an embodiment, the signal quality data may be corrected on the basis of a configuration of a circuit breaker and a disconnecting switch. Since the circuit breaker and the disconnecting switch are typically driven in the same state, a case having different configurations is searched. For example, when the circuit breaker is closed, the disconnecting switch is to be closed, and when the circuit breaker is opened, the disconnecting switch is also to be opened. Accordingly, a facility having a different configuration therefrom may be determined to be faulty.

According to an embodiment, the signal quality data may be corrected by distinguishing a facility having different line impedances of multi-lines. Typically, the line impedances of the multi-lines are the same. Accordingly, the facility having the different impedances may be determined to be faulty.

According to an embodiment, when measurement data is 0 but a state estimation value exists, the signal quality data may be corrected. The case where the measurement data is 0 but the state estimation value exists may be determined to be faulty.

According to an embodiment, when the state estimation value is 0 but the measurement data exists, the signal quality data may be corrected. The case where the state estimation value is 0 but the measurement data exists may be determined to be faulty.

According to an embodiment, signal quality data of an area, in which amounts of power influx and outflux through buses are different, may be corrected. The case where the amounts of influx and outflux are different may be determined to be faulty.

According to an embodiment, when flux values of power flowing from one end and flowing into the other end have a large difference in addition to a loss, the signal quality data may be corrected.

Data obtained by the above-described embodiments or obtained from a facility or a line determined as faulty is not used for system analysis. Accordingly, the signal quality determining unit 102 may correct the above-described data. For example, the signal quality data of "good" may be corrected to that of "suspect"

When the signal quality data is corrected, the signal quality determining unit 102 may transmit the corrected signal quality data to the control unit 103.

When receiving the corrected signal quality data, the control unit 103 generates state estimation data for each RTU on the basis of the corrected signal quality data and the state signal (S107).

When the state estimation data for each RTU is generated, the control unit 103 generates the system analysis information, which is analysis information on all the RTUs, on the basis of the generated state estimation data (operations S109).

Figure 4:
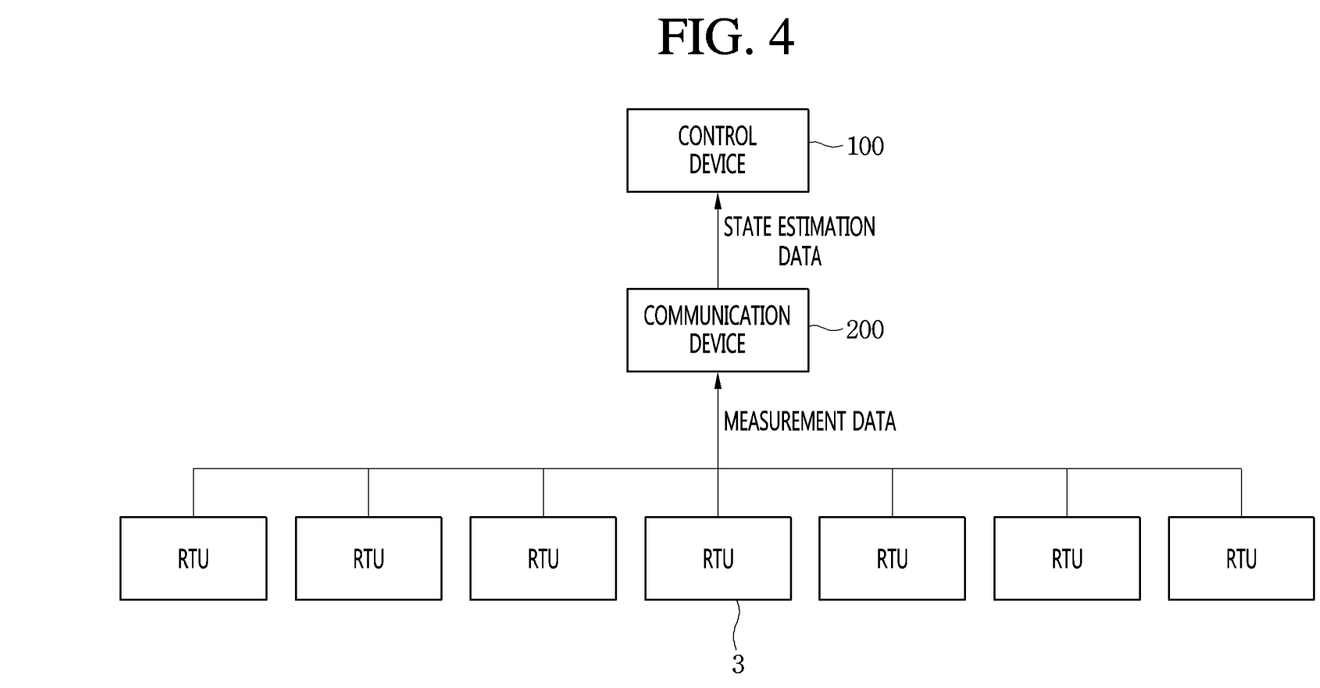
FIG. 4 is a block diagram illustrating a communication system according to an embodiment.

FIG. 4 is a block diagram illustrating a communication system according to an embodiment.

As illustrated in FIG. 4, the communication system may include a control device 100, a communication device 200, and at least one RTU 3.

The control device 100 may include a signal quality determining unit 102 (of FIG. 3) and a control unit 103.

The communication device 200 may receive a state signal from the at least one RTU 3. In addition, the communication device 200 may generate signal quality data including trust information on at least the one received state signal.

The communication device 200 may transmit the received state signal and signal quality data to the control device 100.

As a first example of generating the state estimation data, the control device 100 (or the signal quality determining unit in the control device) may correct the received signal quality data according to a preset condition, and generate the state estimation data based on the corrected signal quality data and the state signal.

In addition, as a second example of generating the state estimation data, the control device 100 generates first state estimation data according to the state signal before correcting the received signal quality data, corrects the signal quality data according to the preset condition, and then modifies the previously generated state estimation data in response to the corrected signal quality data to generate second state estimation data.

Hereinafter, a description will be provided about an example of a method for correcting the signal quality data according to the preset condition with reference to FIGS. 4 to 7.

A first example of correcting the signal quality data will be described with reference to FIG. 4.

As illustrated in FIG. 4, an example of the state signal output from each RTU 3 to the communication device 200 may include measurement data.

Referring to FIG. 4, the control device 100 may obtain the measurement data and signal quality data through the communication device 200.

When the measurement data and the signal quality data are obtained, the control device 100 may generate the state estimation data on the basis of the measurement data, correct the signal quality data according to a preset condition, and modify the generated state estimation data in response to the corrected signal quality data.

When the state estimation data is generated by the control unit 103 in the control device 100, the signal quality determining unit 102 in the control device 100 may correct the obtained signal quality data according to a preset first condition.

As an example of correcting the signal quality data according to the first condition, when the generated state estimation data is not 0 in a state where the measurement data output from each RTU 3 is determined as 0, the signal quality determining unit 102 may determine that the measurement data includes an error, and may correct the signal quality data to "SUSPECT" including information that the measurement data includes the error. When the signal quality data is changed to "SUSPECT", the signal quality determining unit 102 may transmit the corrected signal quality data to the control unit 103.

When the corrected signal quality data is transmitted, the control unit 103 may change the generated state estimation data in response to the information of "SUSPECT" that the measurement data includes the error.

A second example of correcting the signal quality data will described with reference to FIG. 4.

Unlike the first example, when the state estimation data is generated by the control unit 103 in the control device 100, the signal quality determining unit 102 in the control device 100 may correct the obtained signal quality data according to a preset second condition.

As an example of correcting the signal quality data according to the second condition, when the generated state estimation data is determined as 0 in a state where the measurement data output from each RTU 3 is not determined as 0, the signal quality determining unit 102 may determine that the measurement data includes an error, and may correct the signal quality data to "SUSPECT" including information that the measurement data includes the error.

When the signal quality data is changed to "SUSPECT", the signal quality determining unit 102 may transmit the corrected signal quality data to the control unit 103.

When the corrected signal quality data is transmitted, the control unit 103 may change the generated state estimation data in response to the information of "SUSPECT" that the measurement data includes an error.

Third to fifth examples of correcting the signal quality data will be described in detail with reference to FIG. 5.

Figure 5:
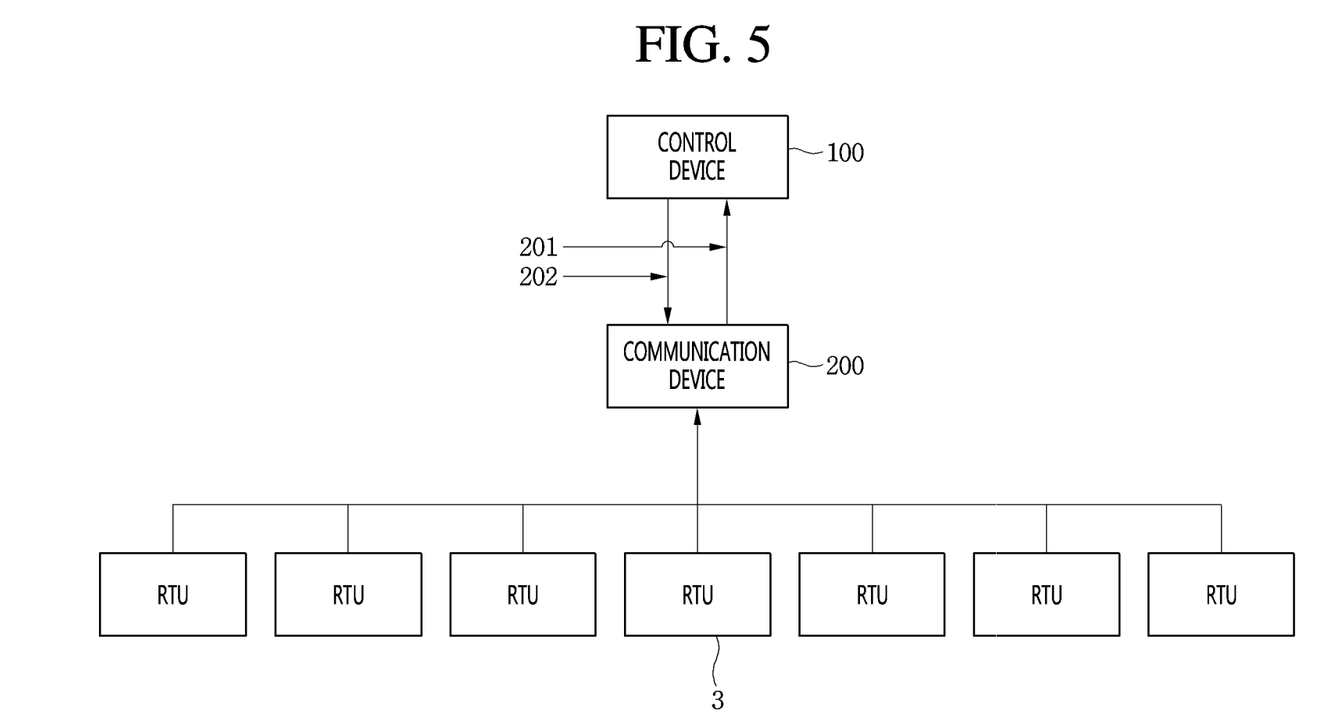
FIG. 5 is a block diagram illustrating a communication system, and a reception side line and a transmission side line between a control device and a communication device according to another embodiment.

As illustrated in FIG. 5, a transmission side line 202 through which data is output from the control device 100 to the communication device 200 and a reception side line 201 through which data is received by the control data 100 from the communication data 200 may be disposed between the control device 100 and communication device 200.

When the state estimation data is generated by the control unit 103 in the control device 100, the signal quality determining unit 102 in the control device 100 may correct the obtained signal quality data according to a preset third condition.

As an example of correcting the signal quality data according to the third condition, when it is determined that a first data amount received by the control device 100 through the reception side line 201 is not the same as a second data amount output from the control device 100 through the transmission side line 202, the signal quality determining unit 102 may determine that the measurement data includes an error and correct the signal quality data to information of "SUSPECT", which includes information that the measurement data includes the error. When the signal quality data is changed to "SUSPECT", the signal quality determining unit 102 may transmit the corrected signal quality data to the control unit 103.

When the corrected signal quality data is transmitted, the control unit 103 may change the generated state estimation data in response to the information of "SUSPECT" that the measurement data includes the error.

As a fourth example of correcting the signal quality data, referring to FIG. 5, the signal quality determining unit 102 may correct the obtained signal quality data according to a preset fourth condition.

A first data amount output from the control device 100 to the communication device 200 through the transmission side line 202 and a second data amount received by the control device 100 through the reception side line 201 may be transmitted through the transmission side line 202 and reception side line 201, and then received by the control device 100 or output to the communication device 200 in a state where a loss occurs in each data.

As an example of correcting the signal quality data according to the fourth condition, when it is determined that the first data amount received by the control device 100 through the reception side line 201 in the state where the loss occurs is different, by a preset data amount or greater, from a second data amount output by the control device 100 through the transmission side line 202 in a state where the loss occurs, the signal quality determining unit 102 may determine that the measurement data includes an error and correct the signal quality data to information of "SUSPECT", which includes information that the measurement data includes the error.

When the signal quality data is changed to "SUSPECT", the signal quality determining unit 102 may transmit the corrected signal quality data to the control unit 103. When the corrected signal quality data is transmitted, the control unit 103 may change the generated state estimation data in response to the information of "SUSPECT" that the measurement data includes the error.

Figure 6:
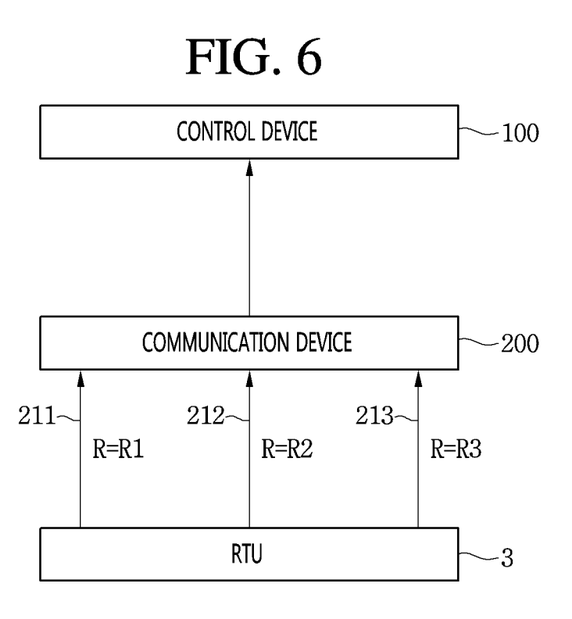
FIG. 6 is a block diagram illustrating a communication system and a plurality of lines between a communication device and a remote terminal unit (RTU) according to another embodiment.

As a fifth example of correcting the signal quality data, referring to FIG. 6, the signal quality determining unit 102 may correct the obtained signal quality data according to a preset fifth condition.

As illustrated in FIG. 6, first to third lines 211, 212, and 213 between the communication device 200 and each RTU 3 may have a line impedance (or resistance) of R.

Referring to FIG. 6, the first to third lines 211, 212, and 213 may respectively have the resistance values of R1, R2, and R3. A case where the resistance values of these lines are the same may be called normal and a case where the resistance values thereof are measured differently from each other may be determined as that specific data includes an error.

In other words, in a case where the line impedance (or resistance) values R1, R2, and R2 of the first to third lines 211, 212, and 213 are determined to be different from each other, the signal quality determining unit 102 in the control device 100 may determine that the measurement data include the error and correct the signal quality data to "SUSPECT", which includes information that the measurement data include the error. When the signal quality data is changed to "SUSPECT", the signal quality determining unit 102 may transmit the corrected signal quality data to the control unit 103. When the corrected signal quality data is transmitted, the control unit 103 may change the generated state estimation data in response to the information of "SUSPECT" that the measurement data includes the error.

Sixth to eighth examples of correcting the signal quality data will be described in detail with reference to FIG. 7.

Figure 7:
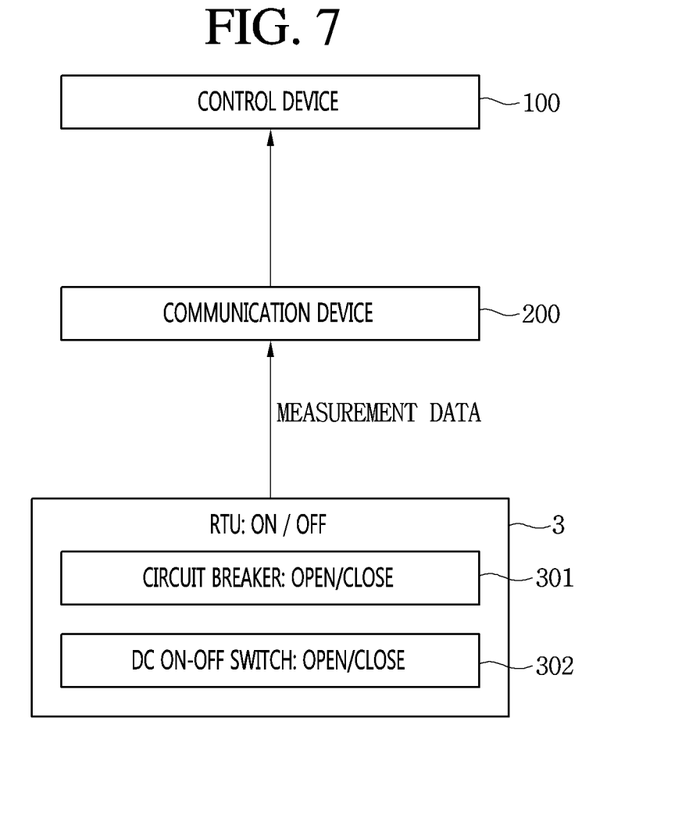
FIG. 7 is a block diagram illustrating a communication system, a circuit breaker in an RTU, and a DC on-off switch according to another embodiment.

Referring to FIG. 7, each RTU 3 in the communication device 200 may be driven (i.e. turned ON, or voltage-applied) according to a control of the control device 100 or an external signal, or power thereof may be turned OFF.

Each RTU 3 may include a circuit breaker 301 and a DC on-off switch 302.

The circuit breaker 301 and the DC on-off switch 302 may be in an OPEN state or CLOSE state (i.e. connected state), and the state of the circuit breaker is the same as that of the DC on-off switch 302.

The signal quality determining unit 102 in the control device 100 may determine whether the circuit breaker 301 and the DC on-off switch 302 are open or connected.

In addition, the control device 100 may transmit a connection command for enabling each circuit breaker 301 to be changed to a connection state, and each circuit breaker 301 receiving the connection command may be connected according to the connection command to drive (ON) the RTU 3 including each circuit breaker 301, and may connect a system (i.e. the control device and the communication device) and each RTU 3.

Furthermore, when the state estimation data is generated by the control unit 103 in the control device 100, the signal quality determining unit 102 in the control device 100 may correct the obtained signal quality data according to a preset sixth condition.

As an example of correcting the signal quality data according to the sixth condition, when the specific RTU 3 is determined to be disconnected from the control device and communication device in a state where all the circuit breakers 301 of the RTUs are connected, the signal quality determining unit 102 may determine that the measurement data output from a corresponding specific RTU 3 includes an error and may correct the signal quality data to "SUSPECT", which includes information that the measurement data include the error.

As a seventh example of correcting the signal quality data, when the state estimation data is generated by the control unit 103 in the control device 100, the signal quality determining unit 102 in the control device 100 may correct the obtained signal quality data according to a preset seventh condition.

As an example of correcting the signal quality data according to the seventh condition, when the specific RTU 3 is connected to the control device and communication device in a state where all the circuit breakers 301 of the RTUs are OPEN, the signal quality determining unit 102 may determine that the measurement data output from a corresponding specific RTU 3 includes an error and may correct the signal quality data to "SUSPECT", which includes information that the measurement data include the error.

As an eighth example of correcting the signal quality data, when the state estimation data is generated by the control unit 103 in the control device 100, the signal quality determining unit 102 in the control device 100 may correct the obtained signal quality data according to a preset eighth condition.

As an example of correcting the signal quality data according to the eighth condition, when a state (e.g. OPEN or CLOSE) of the circuit breaker 301 in a specific RTU 3 is different from a state (e.g. OPEN or CLOSE) of the DC on-off switch 302 in the specific RTU 3, the signal quality determining unit 102 may determine that the measurement data output from the corresponding specific RTU 3 includes an error and correct the signal quality data to "SUSPECT", which includes information that the measurement data includes the error.

For the sixth to eighth examples, when the signal quality data is changed to "SUSPECT", the signal quality determining unit 102 may transmit the corrected signal quality data to the control unit 103.

When the corrected signal quality data is transmitted, the control unit 103 may change the generated state estimation data in response to the information of "SUSPECT" that the measurement data includes the error.

According to an embodiment, the above-described method may be implemented as a processor-readable code on a medium with a program recorded thereon. Examples of the computer readable recording medium include a read-only memory (ROM), random-access memory (RAM), CD-ROMs, magnetic tapes, floppy disks, and optical data storage devices, and also include carrier waves (such as data transmission through the Internet).

According to the operation method of the communication system according to an embodiment may trust matching of each piece of signal quality data and accordingly, improve reliability and matching for a state signal obtained from each RTU.

As can be seen from the foregoing, the above-described embodiments are not limited to the configurations and methods of the embodiments described above, but the entirety of or a part of the embodiments may be configured to be selectively combined such that various modifications of the embodiments can be implemented.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A communication system comprising:
   a communication device receiving a state signal from at least one remote terminal unit (RTU), generating signal quality data for the state signal, and transmitting, to a control device, the signal quality data and the state signal, wherein the signal quality data indicates whether the state signal is normal or erroneous; and
   the control device receiving the signal quality data and the state signal from the communication device, generating a first state estimation data for each of the at least one RTU on a basis of the state signal received from the communication device, correcting the signal quality data transmitted from the communication device according to at least one preset condition, changing the first state estimation data on a basis of the corrected signal quality data and the received state signal to generate a second state estimation data, and generating an analysis information of the at least one RTU based on the second state estimation data,
   wherein, when the corrected signal quality data indicates that a corresponding state signal is erroneous, the corresponding state signal is not used for generation of the analysis information.

2. The communication system according to claim 1, wherein the condition comprises a case where measurement data of the state signal is not determined to be 0 in a state where the state estimation data is 0.

3. The communication system according to claim 1, wherein the condition comprises a case where measurement data of the state signal is determined to be 0 in a state where the first state estimation data is not 0.

4. The communication system according to claim 1, wherein the condition comprises a case where a first data amount received by the control device from the communication device is not the same as a second data amount output from the control device to the communication device.

5. The communication system according to claim 4, wherein the condition further comprises a case where the first data amount and the second data amount have a difference by a preset data amount or more in a state where a loss occurs in the first and second data amounts.

6. The communication system according to claim 1, where at least one line is disposed between each of the at least one RTU and the communication device, and
the condition comprises a case where each impedance value of the at least one line is different from each other.

7. The communication system according to claim 1, wherein each of the at least one RTU comprises a circuit breaker that connects or disconnects each of the at least one RTU to or from the communication device according to whether the circuit breaker is to be open or closed,
the condition comprises a case where a specific RTU is determined to be disconnected from the communication device in a state where the circuit breaker of the at least one RTU is connected, and
the control device changes the first state estimation data for the specific RTU.

8. The communication system according to claim 1, wherein each of the at least one RTU comprises a circuit breaker that connects or disconnects each of the at least one RTU to or from the communication device according to whether the circuit breaker is to be open or closed,
the condition comprises a case where a specific RTU is determined to be connected to the communication device in a state where the circuit breaker of the at least one RTU is open, and
the control device changes the first state estimation data for the specific RTU.

9. The communication system according to claim 1, wherein each of the at least one RTU comprises a connected or opened circuit breaker and a DC on-off switch, and
the condition comprises a case where a connected or open state of the circuit breaker comprised in a specific RTU is different from that of the DC on-off switch comprised in the specific RTU.

10. An operating method of a communication system, the operating method comprising:
receiving, by a communication device, a state signal from at least one RTU;
generating, by the communication device, signal quality data for the state signal, wherein the signal quality data indicates whether the state signal is normal or erroneous;
receiving, by a control device, the signal quality data and the state signal from the communication device;
generating a first state estimation data for each of the at least one RTU on a basis of the state signal;
correcting the signal quality data according to at least one preset condition;
changing the first state estimation data on a basis of the corrected signal quality data and the received state signal to generate a second state estimation data; and
generating an analysis information on the at least one RTU on the basis of the second state estimation data,
wherein, when the corrected signal quality data indicates that a corresponding state signal is erroneous, the corresponding state signal is not used for generation of the analysis information.

11. The operating method according to claim 10, wherein the condition comprises a case where measurement data of the state signal is not determined to be 0 in a state where the first state estimation data is 0.

12. The operating method according to claim 10, wherein the condition comprises a case where measurement data of the state signal is determined to be 0 in a state where the first state estimation data is not 0.

13. The operating method according to claim 10, wherein the condition comprises a case where a first data amount received by the control device from the communication device is not the same as a second data amount output from the control device to the communication device.

14. The operating method according to claim 13, wherein the condition further comprises a case where the first data amount and the second data amount are different by a preset data amount or more in a state where a loss occurs in the first and second data amounts.

* * * * *

UNITED STATES PATENT AND TRADEMARK OFFICE
CERTIFICATE OF CORRECTION

PATENT NO. : 10,444,736 B2  
APPLICATION NO. : 14/970371  
DATED : October 15, 2019  
INVENTOR(S) : Young In Kim et al.

Page 1 of 1

It is certified that error appears in the above-identified patent and that said Letters Patent is hereby corrected as shown below:

On the Title Page

Immediately after Item (65) please insert the following foreign priority data as follows:  
--Foreign Application Priority Data  
April 17, 2015 (KR) 10-2015-0054783--

Signed and Sealed this  
Twenty-fifth Day of February, 2020

Andrei Iancu  
*Director of the United States Patent and Trademark Office*